United States Patent [19]
Boykin et al.

[11] Patent Number: 5,386,557
[45] Date of Patent: Jan. 31, 1995

[54] ENFORCEMENT OF REFERENTIAL CONSTRAINTS IN A DATABASE SYSTEM

[75] Inventors: James R. Boykin, Pflugerville; Lisa A. Geer, Elgin; Gary R. Horn, Austin; Timothy R. Malkemus, Round Rock, all of Tex.

[73] Assignee: International Business Machines Corporation, Armonk, N.Y.

[21] Appl. No.: 975,149

[22] Filed: Nov. 12, 1992

Related U.S. Application Data

[63] Continuation of Ser. No. 421,478, Oct. 13, 1989, abandoned.

[51] Int. Cl.⁶ .................................. G06F 15/40
[52] U.S. Cl. ........................ 395/600; 364/272.1; 364/283.4; 364/DIG. 1
[58] Field of Search ............... 395/600, 700; 364/280.4, 280.5, 282.1, 283.4, 973, 974, 974.4

[56] References Cited

U.S. PATENT DOCUMENTS

| | | | |
|---|---|---|---|
| 4,104,718 | 8/1978 | Poublan et al. | 364/200 |
| 4,330,822 | 5/1982 | Dodson | 364/200 |
| 4,506,326 | 3/1985 | Shaw et al. | 364/900 |
| 4,769,772 | 9/1988 | Dwyer | 395/375 |
| 4,819,160 | 4/1989 | Tanka et al. | 364/200 |
| 4,829,427 | 5/1989 | Green | 364/200 |
| 4,918,593 | 4/1990 | Huber | 364/200 |
| 4,933,848 | 6/1990 | Haderle et al. | 364/200 |
| 4,947,320 | 8/1990 | Crus et al. | 364/200 |
| 4,979,109 | 12/1990 | Tanaka et al. | 364/200 |
| 5,018,067 | 5/1991 | Mohlenbrock et al. | 364/413.02 |
| 5,133,068 | 7/1992 | Crus et al. | 395/600 |
| 5,197,005 | 3/1993 | Shwartz et al. | 395/600 |

OTHER PUBLICATIONS

Selinger et al, "Access Path Selection in a Relational Database Management System", 1979, readings in Database Systems, pp. 82–93, editor: M. Stonebraker.

Astrahan et al, "System R: Relational Approach to Database Management", 1976, from readings in Database Systems, pp. 16–36, editor: M. Stonebraker.

Graefe et al., Dynamic Query Evaluation Plans, ACM, 1989, pp. 358–366.

Lee et al., Progressive Access Plan Selection for Relational Database Systems, Computer Science, Sep. 1987, pp. 1–17.

Primary Examiner—Kevin A. Kriess
Assistant Examiner—Dennis M. Butler
Attorney, Agent, or Firm—Robert M. Carwell; Kenneth C. Hill; Andrew J. Dillon

[57] ABSTRACT

A system and method for enforcing referential integrity within a database system provides for determination of relevant referential constraints at compile time for an access plan. All referential constraints which are relevant to data changes to the database are identified when the access plan is created. Code necessary for performing referential constraint checks is inserted directly into the access plan at compile time, eliminating the necessity for determining the relevant constraints at run time. Constraint checking can be performed using substantially the same low-level procedural statements already used in the access plan for performing database accesses.

10 Claims, 5 Drawing Sheets

Fig. 4 [PRIMARY KEY CHECK]
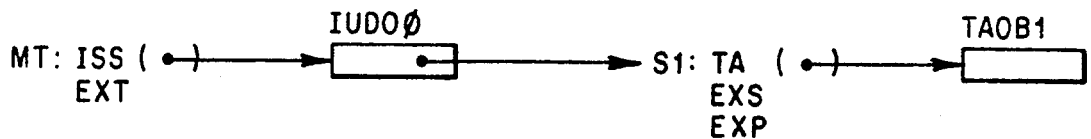
Fig. 5 [ON DELETE RESTRICT]
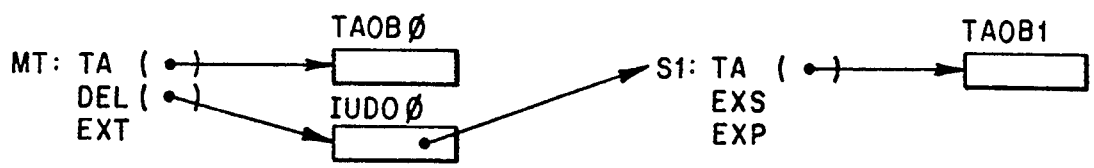
Fig. 6 [ON DELETE SET NULL]
Fig. 7 [ON DELETE CASCADE]
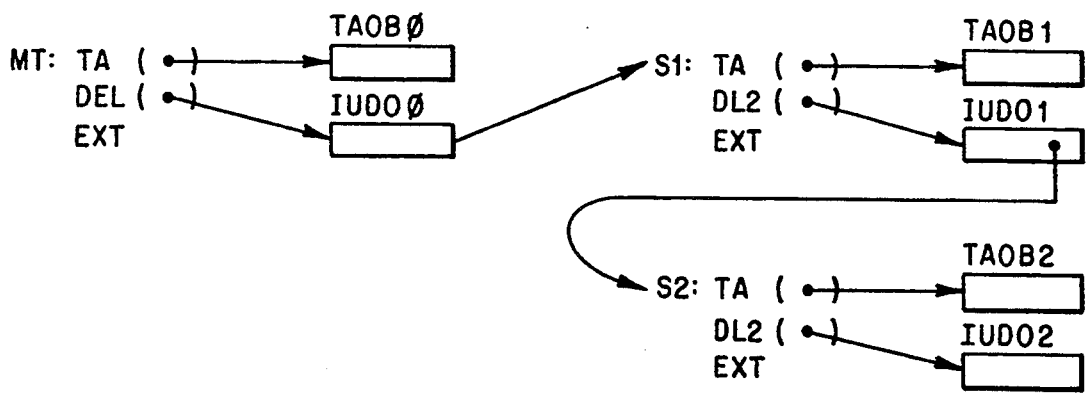

*Fig. 8*  [ON UPDATE RESTRICT]
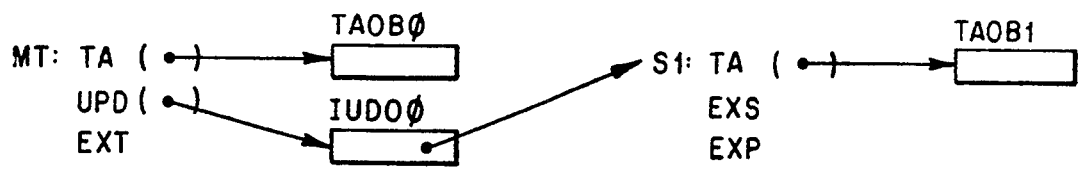
*Fig. 9*  [ON UPDATE SET NULL]
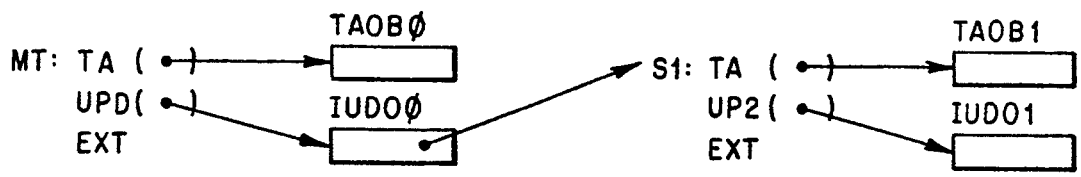
*Fig. 10*  [ON UPDATE CASCADE]
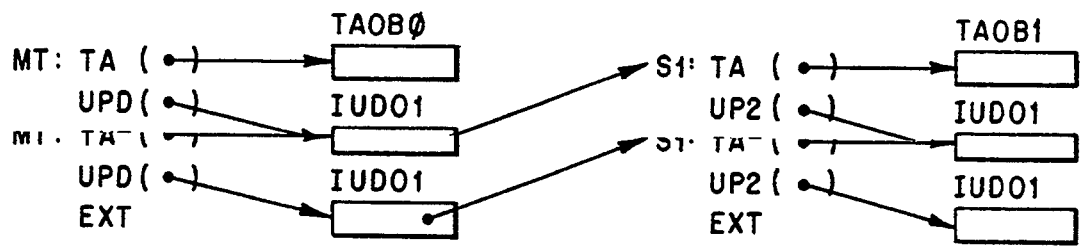
*Fig. 11*  [PRIMARY KEY CHECK]

ENFORCEMENT OF REFERENTIAL CONSTRAINTS IN A DATABASE SYSTEM

This is a continuation, of application Ser. No. 07/421,478, filed Oct. 13, 1989 now abandoned.

BACKGROUND OF THE INVENTION

1. Technical Field

The present invention relates generally to database systems for digital computers, and more specifically to a system and method for enforcing referential constraints when changes are made to the database.

2. Description of the Related Art

In order to increase the speed of database access in digital computer systems, source files containing database access commands can be compiled into access plans. The access plans contain low-level procedural statements to access databases efficiently. Instead of interpreting database access commands at run time in a database manager, the access plans are executed to improve system performance.

Numerous constraints must be satisfied when updating a database in order to maintain its referential integrity. Referential integrity refers to a state of consistency across the database. Referential integrity is enforced by checking all changes made to the database to ensure that they meet the consistency requirements.

In current systems, when changes are made to a table in a database, a determination is made of all of the constraints relevant to such change. The other tables which are affected by such constraints are identified, and routines are executed to perform the necessary consistency checks. The time taken to determine the relevant consistency checks and identify the involved tables can be significant, and contributes to a decrease in overall system performance.

It would be desirable to provide a system and method within a database system which minimizes the time required to perform consistency checks when changes are made to the database.

SUMMARY OF THE INVENTION

It is therefore an object of the present invention to provide a system and method for performing consistency checks when updates are made to a database system.

It is a further object of the present invention to provide such a system and method which minimizes the time required for consistency checks.

It is another object of the present invention to provide such a system and method which enforces referential integrity for the database system.

Therefore, according to the present invention, a system and method for enforcing referential integrity within a database system provides for determination of relevant referential constraints at compile time for an access plan. All referential constraints which are relevant to data changes to the database are identified when the access plan is created. Code necessary for performing referential constraint checks is inserted directly into the access plan at compile time, eliminating the necessity for determining the relevant constraints at run time. Constraint checking can be performed using substantially the same low-level procedural statements already used in the access plan for performing database accesses.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 4–11 illustrate the insertion of low-level code statements into access sections in order to perform constraint checking.

DETAILED DESCRIPTION OF THE PREFERRED EMBODIMENT

Figure 1:
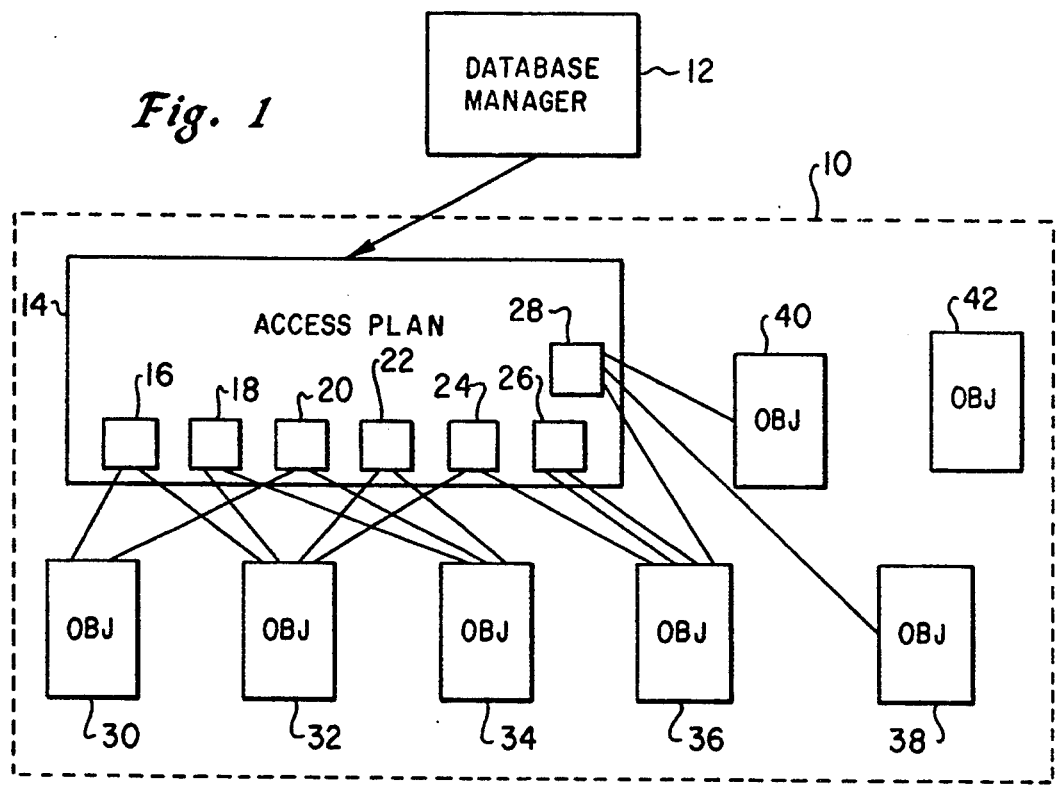
FIG. 1 is a high-level block diagram illustrating a database system.

It will be helpful to an understanding of the present invention to define some important words and concepts used in the description below.

A primary key is a set of columns in a table that must contain unique non-null values. A table cannot have more than one primary key. A foreign key is a set of columns in a table whose values are required to match those of the primary key of a table. A referential constraint is a requirement that non-null values of a designated foreign key are valid only if they also appear as values of the primary key of the designated table. A foreign key value is null if the value of any of its parts is null. A relationship defined by a referential constraint is a set of connections between the rows of a single table or between the rows of two different tables determined by the values of a primary key and a foreign key.

A parent table is the table in a relationship containing the primary key. A table can be a parent in an arbitrary number of relationships. A dependent table is a table in a relationship containing the foreign key. A table can be a dependent in an arbitrary number of relationships. A table can be both a parent and a dependent.

A dependent row is a row of a dependent table that has a foreign key value which matches a primary key value of its parent table. The foreign key value thus represents a reference from the dependent row to a parent row. A parent row is a row of a parent table that has at least one dependent row.

A delete rule is associated with each referential constraint. The delete rule can restrict (prevent) the deletion of a parent row, or it may specify the effect of a deletion on the dependent rows. The effect can either be the deletion of the dependent rows (cascading of the delete), or the setting of the foreign key in the dependent rows to null.

An update rule is also associated with each referential constraint. One approach to handling update rules is to restrict the updating of a primary key in a parent row. Another approach is to specify the effect of an update on the dependent rows so that, for example, cascading of updates would be possible.

Each time a change is made to the database, all relevant referential constraints must be satisfied. If any are not, the change is not allowed. Enforcement of the following rules for foreign keys ensures referential integrity of the database:

Insert Rule: When a row is inserted into a dependent table, each non-null foreign key value in the inserted row must match some value of the primary key of the parent table of the relationship. If any referential constraint is violated by an insert operation, an error occurs and no rows are inserted.

Delete Rules: When a row is deleted from a parent table, a check is performed to determine whether there are any dependent rows in the dependent table. A dependent row is one which has a foreign key value which matches the primary key of the row to be deleted. If any dependent rows are found, the action taken is prescribed by a delete rule specified for the foreign key in the dependent table.

Three delete rules can be specified for a foreign key. If the rule is RESTRICT, if any dependent rows are found, an error occurs and no rows are deleted. If the delete rule is CASCADE, any dependent rows in the dependent table are deleted. Any other referential constraints on the deleted rows of the dependent table must also be satisfied, or an error occurs and no rows are deleted. For a delete rule of SET NULL, if any dependent rows are found in the dependent table, all nullable parts of the foreign key are set to null.

Update Rule: When a row is updated in a parent table, a check is performed to determine whether there are any dependent rows in the dependent table. A dependent row is one which has a foreign key value which matches the primary key of the row to be updated. If any dependent rows are found, the action taken is prescribed by an update rule specified for the foreign key in the dependent table.

Three update rules can be specified for a foreign key. If the rule is RESTRICT, if any dependent rows are found, an error occurs and no rows are updated. If the update rule is CASCADE, the foreign keys in any dependent rows in the dependent table are updated to their corresponding primary key parts. Any other referential constraints on the updated rows of the dependent table must also be satisfied, or an error occurs and no rows are updated. For an update rule of SET NULL, if any dependent rows are found in the dependent table, all nullable parts of the foreign key are set to null.

Update foreign key rule: When a foreign key is updated in a dependent table, if the foreign key is not null its new value must match some value of the primary key of the parent table of the relationship. If any referential constraint is violated by the update operation, an error occurs and no rows are updated.

Referring to FIG. 1, a database 10 is accessed by a database manager 12. Database manager 12 is called by application programs (not shown) in order to provide access to the database 10. Access to the database 10 is not allowed other than through the database manager 12.

When an application invokes the database manager 12, it can in turn invoke an access plan 14 to perform the requested database accesses. Access plan 14 contains low-level interpreted code which has been compiled from a higher order database access language such as SQL or similar language. The access plan 14 contains a plurality of access sections 16, 18, 20, 22, 24, 26, 28. Each of the access sections 16–28 correspond substantially to one source level statement in SQL or a similar high order database access language.

The access plan 14 exists as an object contained within the database 10. Also contained within the database 10 are a plurality of other database objects 30, 32, 34, 36, 38, 40, 42. Various types of database objects 30–42 may exist, with those most relevant to the present invention being tables of data.

Each access section 16–28, corresponding to an SQL statement, accesses one or more tables 30–42 within the database 10. Depending on the nature of the statement compiled into each access section, the data in these tables may be read or changed, or rows within the tables may be inserted or deleted. As illustrated in FIG. 1, access sections may refer to more than one table, and many different access sections may refer to a single table. Tables may be referenced by access sections within many different access plans. For example, access sections 16, 18, 22, and 24 all refer to table 32. Access section 26 refers only to table 36, while section 28 refers to tables 36, 38, and 40.

Figure 2:
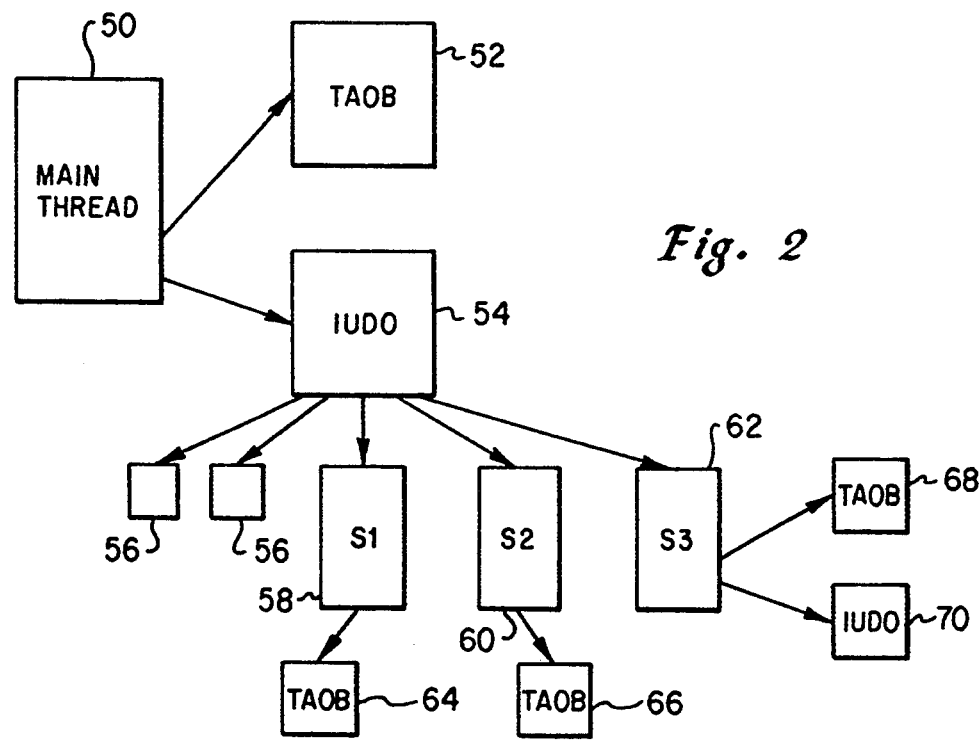
FIG. 2 is a block diagram of an access section.

FIG. 2 illustrates the structure of a typical access section. Main thread 50 is a thread, or block, of low-level code for performing the function of the SQL statement which the access section represents. The code in main thread 50 contains pointers to a table object 52 (TAOB) and an insert/update/delete object 54 (IUDO). A table object is a control block containing all information which is necessary to access a table within the database. An IUDO is a control block containing all information and procedures which are needed to either insert into, update, or delete from a table. Not all main threads 50 contain pointers to both types of objects 52, 54. Only those needed to perform the operation are included.

TAOB 52 contains all identifiers necessary to locate a table within the database. In addition, any predicates which appear in the original SQL statement are included in TAOB 52. These predicates are used by table access operators to select rows of a table which meet the criteria which they define, and are found in WHERE clauses of the SQL statements. The predicates typically consist of relational operators, such as greater than or less than, and generate a result of TRUE or FALSE.

IUDO 54 contains pointers to any data values 56 which are necessary to perform the operation defined by main thread 50. These values include, for example, numeric constants and character constants which are included in the original SQL statement. IUDO 54 also contains pointers to subthreads 58 (S1), 60 (S2), and 62 (S3). Subthreads 58, 60, and 62 are blocks of low-level code similar to main thread 50. Subthreads can include code for evaluating and manipulating various numeric and character based expressions. In order to maintain referential integrity of the database, subthreads are included which perform all necessary constraint checking required by the statement represented by main thread 50. The subthreads 58, 60, 62 are executed prior to completing execution of the operations of main thread 50. The operators within main thread 50 execute completely only if the values returned by the necessary subthreads have the appropriate values expected by those operators, indicating that the operation does not violate referential integrity requirements.

Just as the main thread 50 can have associated TAOB 52 and IUDO 54, subthreads 58, 60, 62 also contain pointers to table objects and possibly insert/update/delete objects. For example, in FIG. 2 subthread 58 contains a pointer to TAOB 64, and subthread 60 contains a pointer to TAOB 66. Neither subthread 58 nor 60 contains a pointer to an IUDO. In this example, subthread 62 contains pointers to both a TAOB 68 and an IUDO 70.

Figure 3:
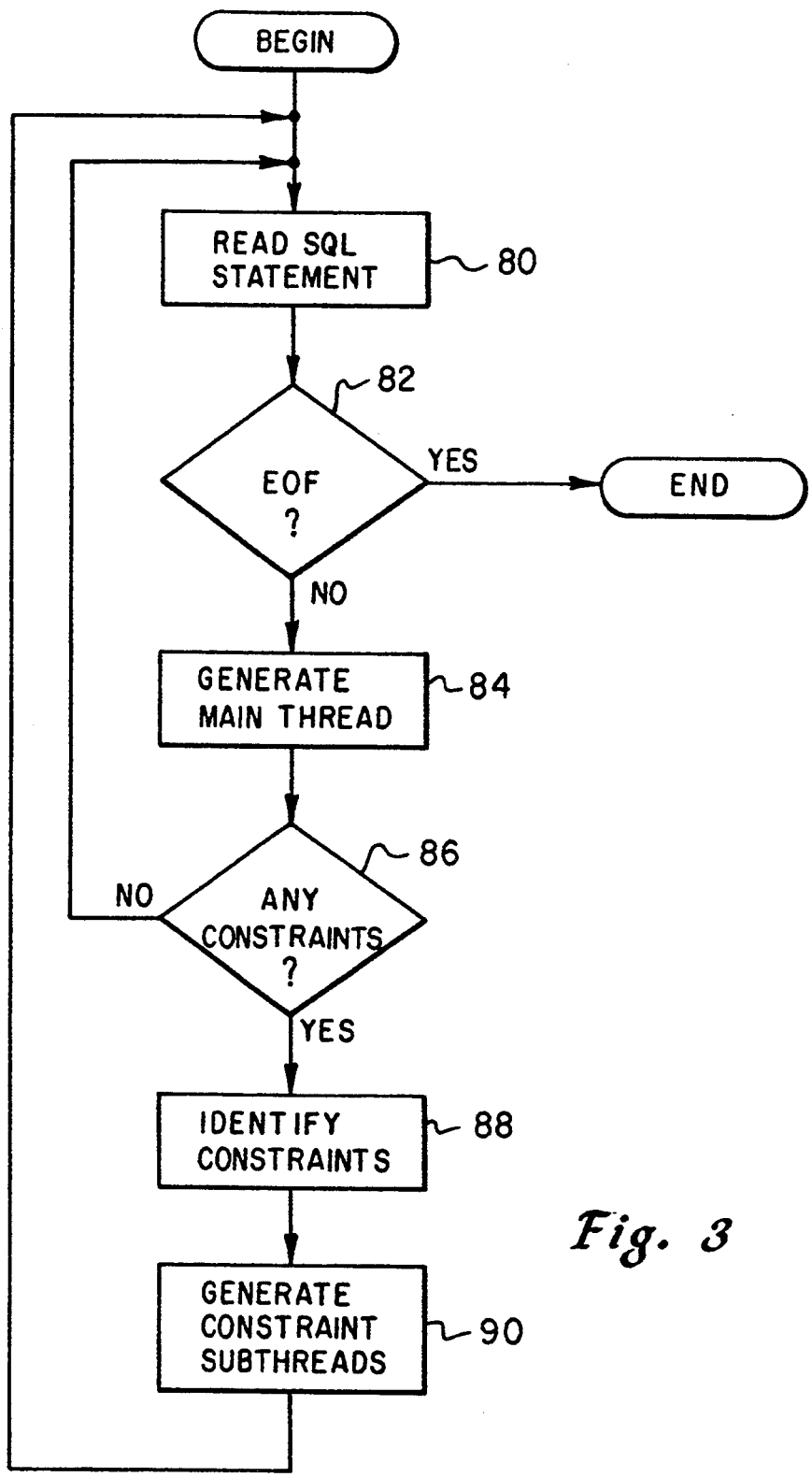
FIG. 3 is a flowchart illustrating the compilation procedure for an access plan.

As described above, subthreads are included under IUDO 54 which are necessary to perform all constraint checks needed to enforce referential integrity of the database when executing main thread 50. Determination of all necessary constraint checks is made at the time the access plan is compiled, and the appropriate subthreads are inserted by the compiler. This process is illustrated in FIG. 3.

The preferred method for compiling a source file of SQL, or other similar high-level database access language, statements begins with the compiler reading an SQL statement 80. If the compiler has reached the end of the source file 82, the compilation is complete. If the end of file has not been reached, the main thread for that statement is generated 84.

Some statements, such as the SELECT statement, do not require any constraint checks to be made. A check is made to see if any constraints are required 86, and if not, control returns to step 80 and the next statement is read. If the statement currently being compiled does require constraint checks to be made 86, the constraints are identified 88. Constraint identification includes identification of parent and dependent tables in a relationship, and determination of which delete rule or update rule is used for a foreign key if the operation is a delete or update operation. When all of the constraints have been identified 88, the appropriate constraint subthreads are generated 90 and linked to the IUDO of the just generated main thread. Control then returns to step 80 for the next source statement to be read.

It will be appreciated by those skilled in the art that the checking of all possible relationships to determine which constraint subthreads need to be generated adds to the time and complexity of the compilation process. It will be further appreciated that, since this process is performed at compilation time, and the appropriate subthreads linked directly into the code used for performing the main thread, it is not necessary to make such checks at execution time for the access plan which has been generated. This speeds the overall execution of the access plan, thereby enhancing database system performance. Since access plans are typically compiled once and executed a relatively large number of times, the increase in compilation time has much less effect than the decrease in execution time.

Since the code for performing all constraint checking is placed directly in the access plan, an access plan is no longer valid when changes are made in the relationships between tables in the database. Therefore, it is necessary to invalidate the access plan when such a change is made, and recompile at least the affected access sections before the plan is again executed. Not all changes in relationships require access plan invalidation and recompilation. Co-pending application Ser. No. 07/421,476, titled ACCESS PLAN INVALIDATION FOR DATABASE SYSTEMS, which has been incorporated herein, describes a preferred technique for determining when access plans must be invalidated.

FIGS. 4–10 illustrate the use of subthreads to implement several important constraint checks, and code examples for implementing such constraint checks. In each case, the main thread is identified by MT:, and subthreads are indicated by S1 and S2. In each case, subthreads are shown for implementing only a single constraint check for each main thread. However, in many cases, multiple constraints must be checked for a single SQL statement, and multiple subthreads corresponding to these constraints will be included. Multiple subthreads are included by simply placing pointers to them in the IUDO.

The following low-level operators are used in the main thread and subthread code examples of FIG. 4–10:

DEL: This operator contains a pointer to an IUDO. If any of the constraint subthreads pointed to by the IUDO returns a value of TRUE, the delete fails. This situation occurs when deletion of a row containing a primary key would be inconsistent with the delete rules of dependent foreign keys, and no change is made to the database. If a FALSE is returned, the delete operation proceeds as expected.

DL2: This operator functions in the same manner as the DEL operator, except that a field used to count cascaded deletions is incremented rather than a field used to count direct deletions being incremented as occurs with the DEL operator.

EXS: This operator determines whether a match exists when a previous operator, such as the TA operator, was executed. If a previous TA operator found a matching record, a value of TRUE is placed on a boolean stack, and FALSE is placed on the stack otherwise.

EXP: This operator is an exit thread operator, which causes a predicate (constraint checking) subthread execution to end. Upon exiting a subthread, this operator pops a value off of the boolean stack and returns that value.

EXT: This operator simply exits a thread or subthread, returning control to the location from which such thread or subthread was called.

ISS: This operator is used to insert a row into a table. It contains a pointer to an IUDO, and completes execution only if the return value of its constraint subthreads is TRUE. A return value of FALSE indicates that the insert operation is to be aborted. This occurs when an attempt is made to insert a row containing a foreign key that does not match a primary key.

TA: This operator is a table access operator, and contains a pointer to a TAOB. This operator selects all rows within the table associated with the TAOB which match the criteria defined by the predicates within the TAOB.

UPD: This operator is an update operator, and contains a pointer to an IUDO. An IUDO for an update contains pointers to constraint subthreads when primary keys are updated and when foreign keys are updated. The UPD operator completes execution only if the return value for all constraint subthreads for updates of primary keys is FALSE. A return value of TRUE indicates the update operation is to be aborted. This situation occurs when an attempt is made to update a primary key that has matching foreign key values. For each update of a primary key, a check is made to determine if the primary key value has actually changed. If it has not changed, the constraint subthreads for updates of primary keys are not performed. The UPD operator also completes execution only if the return value for all constraint subthreads for updates of foreign keys is TRUE. A return value of FALSE indicates the update operation is to be aborted. This situation occurs when an attempt is made to update a foreign key to a new value that does not match a primary key.

UP2: This operator performs in the same manner as the UPD operator, except that a special field is incremented in order to count updated dependent rows.

Referring to FIG. 4, code for performing a primary key check is shown for an insert into a dependent table. This check is made when a new non-null foreign key value is produced, in order to ensure that the new key is contained in the parent table. The ISS operator points to IUDO0, which in turn points to subthread S1. Within subthread S1, the TA operator is used to search for a row in the parent table (pointed to by TAOB1) which has a primary key value matching the newly added foreign key. EXS places a TRUE or FALSE value on the boolean stack, and this value is popped from the stack and returned by the EXP operator.

If FALSE is returned to the ISS operator, a matching primary key was not found in the parent table, and the insert operation is not allowed.

Referring to FIG. 5, low-level code is shown for performing a delete operation when the delete rule for the foreign key of a dependent table is RESTRICT. TAOB0 includes all predicates that appear in the source delete statement, and IUDO0 includes a pointer to subthread S1. TAOB1 includes those predicates necessary to search for rows in a dependent table whose foreign keys match the primary key of the parent table row being deleted. In the main thread, the TA operator selects the rows in the parent table to be deleted, and the DEL operator deletes the selected rows if a FALSE is returned. Within subthread S1, the TA operator points to TAOB1, searching for rows having foreign keys which match the primary key of the selected row. Subthread S1 is performed for each row of the parent table which has been selected by the TA operator of the main thread. TRUE is returned by the EXP operator if such a matching row was found, and the delete operation is aborted.

Referring to FIG. 6, code is shown for performing a delete operation wherein the foreign key of a dependent table has the delete rule SET NULL. This example is similar to that of FIG. 5, with the exception that subthread S1 includes a UP2 operator which contains a pointer to IUDO1. IUDO1 lists the nullable parts of the foreign key in the dependent table, and assigns a value of null to these parts when called. As the TA operator scans the dependent table, the UP2 operator is performed on each row which matches the primary key of the parent row being deleted. The EXT operator does not return a boolean value, so that the DEL operator in the main thread always succeeds.

FIG. 7 illustrates code for performing a delete when the delete rule of the foreign key in the dependent table is CASCADE. The code of FIG. 7 is similar to the code of FIG. 6, except that subthread S1 has a DL2 operator instead of a UP2 operator to allow cascaded deletions to be performed, and IUDO1 has a pointer to subthread S2 to allow an additional level of cascaded deletions to be performed. Subthread S2 is the same as subthread S1, except that TAOB2 and IUDO2 reference different tables than do TAOB1 and IUDO1. If the delete chain cascades to a third table, IUDO2 would contain a pointer to another subthread to handle deletes for that table. The DL2 operator in subthreads S1 and S2 deletes from the dependent tables all rows found by the TA operators in their respective subthreads.

Referring to FIGS. 8, 9, and 10, code is shown which illustrates subthreads for enforcing constraints on an update operation. In each case, a check is made to determine if the primary key value has actually changed. If it has not changed, the constraint subthreads are not performed.

The code of FIG. 8 applies when the update rule for the dependent table is RESTRICT. In the main thread, the TA operator selects rows from the parent table, and the UPD operator updates the selected rows if a value of FALSE is returned to it. Within subthread S1, the TA operator determines whether there are any rows within the dependent table which have foreign keys matching the primary key of the parent row. If a match is found, indicating that the update operation should not be performed, the EXS and EXP operators return a TRUE value to the UPD operator. If no such matching row is found, FALSE is returned and the update operation is allowed to complete.

FIG. 9 illustrates a constraint checking subthread to be used when the update rule for the foreign key in the dependent table is SET NULL. Within the subthread S1, IUDO1 lists the nullable parts of the foreign key within the dependent table, and the UP2 operator assigns null to these parts for each row within the dependent table selected by the TA operator. As in the on delete set null case, subthread S1 will not cause the UPD operator in the main thread to fail.

FIG. 10 illustrates code used to perform an update wherein the update rule for the foreign key in the dependent table is CASCADE. IUDO1 list the foreign key parts of the dependent table which correspond to updated parts of the parents primary key. The UP2 operator causes these foreign key parts to be set to the corresponding primary key part values for each row in the dependent table selected by the TA operator within subthread S1. If the cascade continues beyond the first dependent table, IUDO1 will contain a pointer to another subthread as occurs in the on delete cascade case.

Referring to FIG. 11, code for performing a primary key check is shown for an update of a foreign key value. This check is made when a new non-null foreign key value is produced, in order to ensure that the new key is contained in the parent table. The UPD operator points to IUDO0, which in turn points to subthread S1. Within subthread S1, the TA operator is used to search for a row in the parent table (pointed to by TAOB1) which has a primary key value matching the newly added foreign key. EXS places a TRUE or FALSE value on the boolean stack, and this value is popped from the stack and returned by the EXP operator.

If FALSE is returned to the UPD operator, a matching primary key was not found in the parent table, and the update operation is not allowed.

Since many tables will be involved in relationships as both a parent and a dependent, constraint checking subthreads must be included for all relevant constraints. If any of the constraint subthreads fail, the operation defined by the main thread also fails.

All of the constraints described above can be implemented in a straightforward manner using subthreads. A more difficult constraint to process at execution time is a self-referencing constraint on a delete statement with a delete rule of cascade. This special case is preferably handled in a different manner as will now be described.

With a delete rule of CASCADE and a self-referencing constraint, every row deleted from a table may have multiple dependent rows in the same table which themselves may have multiple dependent rows within that table. These multiple dependencies can continue recursively to an unknown depth, depending upon the data contained within the table. A recursive procedure to implement constraint checking could require a call stack of indeterminable maximum size. Therefore, a preferred method for performing this special case constraint check using an iterative technique will now be described.

Figure 12:
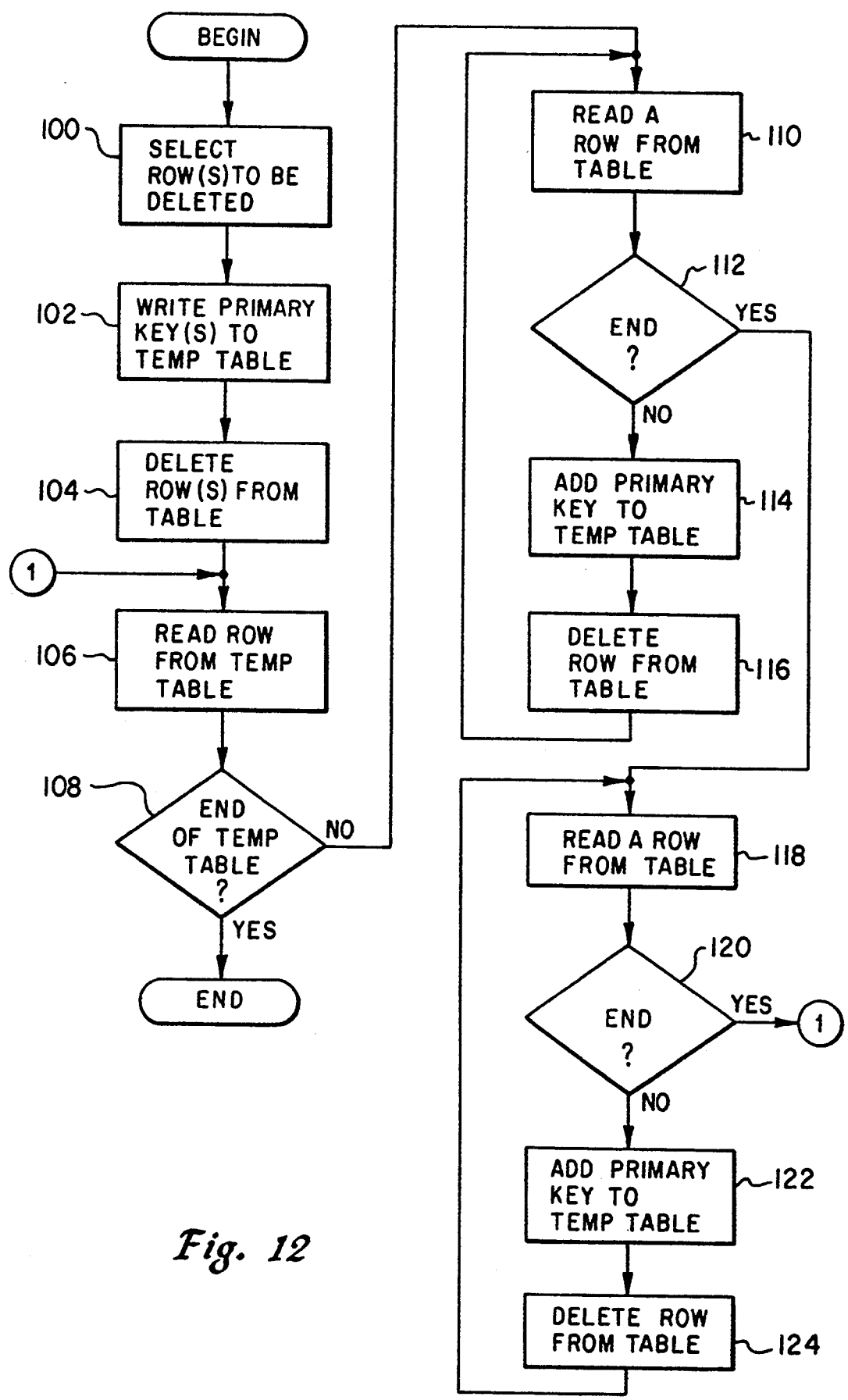
FIG. 12 is a flowchart illustrating the function of low-level code inserted into an access plan for enforcing referential constraints with a delete rule of cascade when a deletion is made in a self-referencing table.

Referring to FIG. 12, a flowchart for performing constraint checking for a self-referencing constraint on a delete statement with a delete rule of CASCADE is shown.

First, a row or rows to be deleted is selected 100. This could be a single row currently selected by a cursor, or could be one or more rows selected based upon some comparison criteria. In the latter case, the familiar TA operator can be used to select the rows to be deleted from the table.

For the row or rows selected in step 100, the primary key for each row is written to a temporary table 102. The selected row or rows are then deleted from the original table 104 using the DEL operator. A row, which contains a newly deleted primary key value, is then read from the temporary table 106. A check is then made 108 to see whether the temporary table is empty. If so, the procedure is complete. If not, control passes to step 110.

In step 110, a row within the original table, having a dependent key matching the primary key just selected from the temporary table, is read using the TA operator 110. Step 112 indicates a test to see whether any more matching rows have been found. If the end of the table has not been reached, the primary key from the newly selected row is added to the temporary table 114, and the row is deleted from the table 116. This process continues until all matching rows have been found by the TA operator.

The loop defined by steps 110-116 applies to a single self-referencing constraint. That is, one foreign key is checked to see whether it matches the primary key most recently read from the temporary table. It is possible for there to be two or more different self-referencing constraints within a single table. If additional self-referencing constraints exist, control passes from step 112 to step 118 after the original table has been completely scanned one time. Steps 118, 120, 122, and 124 correspond to steps 110-116 and cause the original table to be scanned again, except that the predicates in the table object referenced by the TA operator of step 118 are different from those in the table object referenced by the TA operator of step 110. This means that a different referential constraint is checked by the loop of steps 118-124.

Assuming that only two different self-referencing constraints exist for the original, once the test of step 120 indicates that the table has been completely scanned control returns to step 106 to read a new primary key from the temporary table. The entire process is then completed with the primary key newly read from the temporary table. This cycle continues, with new primary keys being added to the temporary table as rows are deleted and being removed from the temporary table each time control returns to step 106 until the temporary table is exhausted. Since the self-referencing constraints are restricted to a single table, eventually the temporary table, or the original table itself, will become empty.

If only a single self-referencing constraint exists for the original table, decision step 112 would return control directly to step 106 and the loop of steps 118-124 would not exist. If three or more different self-referencing constraints existed, control would pass from decision step 120 to the beginning of a loop for the next referential constraint, and the final loop would return control to step 106. Since the number and identity of the constraints are known at compile time for the access plan, only the precise number of loops required are written into the access section by the compiler.

The system and method described above provides for the compilation of subthreads for performing constraint checks directly into the access plan. This provides for increased run time efficiency, since the existence and identity of the relevant constraints does not need to be determined at run time. The code for performing the constraint checks can be attached to the main threads for the various access sections in a manner consistent with previous construction of such access sections.

While the invention has been particularly shown and described with reference to a preferred embodiment, it will be understood by those skilled in the art that various changes in form and detail may be made therein without departing from the spirit and scope of the invention.

What is claimed is:

1. A method for generating an access plan for a relational database, having a plurality of database objects, from a plurality of database access commands used to access the database objects, said method comprising the steps performed by a computer system of:
   compiling the plurality of database access commands into a first executable code set for inclusion in the access plan;
   during said compiling step, determining constraint relationships among selected database objects utilized during execution of the plurality of database access commands;
   also during said compiling step, generating a plurality of second executable code sets to enforce the determined constraint relationships; and
   also during said compiling step, merging the first executable code set and the plurality of second executable code sets to form an access plan having both code for executing the database access commands and code for enforcing the determined constraint relationships within the access plan.

2. The method of claim 1, wherein the access plan contains a plurality of access sections, each of said plurality of access sections corresponding to one of the database access commands.

3. A computer system for generating an access plan for a relational database having a plurality of database objects from a plurality of database access commands used to access the database objects, said computer system comprising:
   means for compiling the plurality of database access commands into a first executable code set for inclusion in the access plan;
   means for, during compilation of the database access commands, determining constraint relationships among selected database objects utilized during execution of the plurality of database access commands;
   means for, during compilation of the database access commands, generating a plurality of second executable code sets for enforcing the determined constraint relationships; and,
   means for, during compilation of the database access commands, merging the first executable code set and the plurality of second executable code sets to form an access plan having both code for executing the database access commands and code for enforcing the determined constraint relationships within the access plan.

4. The computer system of claim 3, wherein the access plan contains a plurality of access sections, each corresponding to one of the database access commands.

5. The computer system of claim 4, wherein each of said plurality of access sections corresponds to one of said plurality of database access commands.

6. The computer system of claim 5, wherein each of said plurality of second executable code sets is associated with one of said plurality of database access commands.

7. A method for performing database operations on data tables in a database system, comprising the steps performed by a computer system of:
   providing a plurality of access plans, each corresponding to a selected group of database operations and containing compiled code for accessing tables in the database, each access plan further containing code for performing constraint checking during table access and preventing execution of database operations which would not be consistent with referential integrity of the database;
   performing a database access by executing the compiled accessing code in a corresponding access plan; and
   during said step of performing a database access, maintaining the referential integrity of the database by executing the constraint checking code contained in such corresponding access plan.

8. The method of claim 7, wherein said step of providing access plans comprises the steps of, for each provided access plan:
   compiling a set of source instructions into a first set of compiled code;
   during said compiling step, determining which constraints must be checked during execution of the first set of compiled code in order to ensure referential integrity of the database;
   providing a second set of compiled constraint checking code containing instructions required for maintaining the referential integrity of the database; and
   merging the first and second sets of compiled code into a single access plan containing compiled code for both accessing tables in the database and code for performing constraint checking during table access.

9. The method of claim 8, wherein the first set of compiled code comprises a plurality of subsets of compiled code, each subset corresponding to one source instruction.

10. The method of claim 9, wherein said second set of compiled code comprises a plurality of subsets, and wherein each of the second set subsets is associated with one of the first plurality of subsets.

* * * * *